US012328073B2

United States Patent
Jiang et al.

(10) Patent No.: US 12,328,073 B2
(45) Date of Patent: Jun. 10, 2025

(54) OPTICAL STORAGE CONVERTER, CONTROL METHOD AND DEVICE THEREFOR, AND COMPUTER READABLE STORAGE MEDIUM

(71) Applicant: Gree Electric Appliances, Inc. of Zhuhai, Guangdong (CN)

(72) Inventors: Yingyi Jiang, Guangdong (CN); Meng Huang, Guangdong (CN); Peiyu Dang, Guangdong (CN); Songru Huang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 289 days.

(21) Appl. No.: 18/014,234

(22) PCT Filed: Jul. 9, 2021

(86) PCT No.: PCT/CN2021/105383
§ 371 (c)(1),
(2) Date: Jan. 3, 2023

(87) PCT Pub. No.: WO2022/012421
PCT Pub. Date: Jan. 20, 2022

(65) Prior Publication Data
US 2023/0261577 A1    Aug. 17, 2023

(30) Foreign Application Priority Data
Jul. 15, 2020 (CN) .......................... 202010680650.0

(51) Int. Cl.
*H02M 3/158* (2006.01)
*H02J 3/32* (2006.01)
*H02M 1/00* (2007.01)

(52) U.S. Cl.
CPC ............. *H02M 3/1582* (2013.01); *H02J 3/32* (2013.01); *H02M 1/0009* (2021.05); *H02J 2300/24* (2020.01)

(58) Field of Classification Search
CPC .................................. H02M 1/00; H02M 3/00
See application file for complete search history.

(56) References Cited

U.S. PATENT DOCUMENTS

2017/0229867 A1* 8/2017 Ghotra .................... H02J 3/007

FOREIGN PATENT DOCUMENTS

CN        201440614 U   *  4/2010
CN        103840484 A      6/2014
(Continued)

OTHER PUBLICATIONS

CN 202010680650.0, Notice of Handling Registration Procedures, Nov. 12, 2024.
(Continued)

*Primary Examiner* — Rexford N Barnie
*Assistant Examiner* — Joseph N Inge
(74) *Attorney, Agent, or Firm* — The Webb Law Firm

(57) ABSTRACT

The present disclosure relates to an optical storage converter, a control method and device thereof, and a computer readable storage medium. The control method for the optical storage converter includes: obtaining a voltage measurement and a current measurement of a universal interface of optical storage converter in the case where an apparatus is accessed to the universal interface, to determine whether the apparatus accessed to the universal interface is a photovoltaic system or an energy storage system; and adjusting an internal circuit of the optical storage converter correspondingly in the case where the accessed apparatus is the photovoltaic system or the energy storage system.

18 Claims, 6 Drawing Sheets

(56) References Cited

FOREIGN PATENT DOCUMENTS

| | | | |
|---|---|---|---|
| CN | 104868495 A | | 8/2015 |
| CN | 105337306 A | | 2/2016 |
| CN | 105515033 A | * | 4/2016 |
| CN | 107612033 A | | 1/2018 |
| CN | 108123519 A | | 6/2018 |
| CN | 108599537 A | | 9/2018 |
| CN | 108631364 A | | 10/2018 |
| CN | 110112777 A | * | 8/2019 |
| CN | 111756069 A | | 10/2020 |
| CN | 212258436 U | | 12/2020 |
| WO | 2019192040 A1 | | 10/2019 |

OTHER PUBLICATIONS

CN 202010680650.0, Notice of First Examination Opinion, Aug. 22, 2024.
Zhang, Xufeng et al., Design of Photovoltaic Energy Storage Integrated Converter Based on Dual-Loop Decoupling Control, Shandong Industrial Technology, 2019.

* cited by examiner

OPTICAL STORAGE CONVERTER, CONTROL METHOD AND DEVICE THEREFOR, AND COMPUTER READABLE STORAGE MEDIUM

CROSS-REFERENCE TO RELATED APPLICATIONS

The present application is the United States National Stage of International Application No. PCT/CN2021/105383 filed on Jul. 9, 2021, and claims priority to Chinese Patent Application No. 202010680650.0 filed on Jul. 15, 2020, both of which are incorporated herein by reference in their entireties.

BACKGROUND OF THE INVENTION

Field of the Invention

The present disclosure relates to the field of power electronics technology, and in particular, to an optical storage converter, a control method and device thereof, and a computer-readable storage medium.

Description of Related Art

With the development of power electronics technology, inverter photovoltaics are applied in direct current (DC) micro-grid systems such as photovoltaic power generation systems and energy storage substations. In practical applications, an alternating current (AC) to DC, a photovoltaic DC, and an energy storage DC are designed individually, and the photovoltaic DC, the energy storage DC and the AC to DC are also combined in low power systems, such that corresponding photovoltaic and energy storage interfaces are designed respectively, as shown in FIG. 1.

SUMMARY OF THE INVENTION

According to one aspect of the present disclosure, a control method of an optical storage converter is provided. The method comprises: obtaining a voltage measurement and a current measurement of a universal interface of the optical storage converter in the case where an apparatus is accessed to the universal interface, to determine whether the apparatus accessed to the universal interface is a photovoltaic system or an energy storage system; and adjusting an internal circuit of the optical storage converter correspondingly in the case where the accessed apparatus is the photovoltaic system or the energy storage system.

In some embodiments of the present disclosure, the step of adjusting an internal circuit of the optical storage converter correspondingly in the case where the accessed apparatus is the photovoltaic system or the energy storage system comprises: adjusting a DC to DC converter circuit inside the optical storage converter to operate as a boost circuit in the case where the accessed apparatus is the photovoltaic system; and adjusting a DC to DC converter circuit inside the optical storage converter to operate as a buck-boost circuit in the case where the accessed apparatus is the energy storage system.

In some embodiments of the present disclosure, the step of adjusting a DC to DC converter circuit inside the optical storage converter to operate as the buck-boost circuit in the case where the accessed apparatus is the energy storage system comprises: adjusting the buck-boost circuit to be a buck operation mode in the case where the energy storage system works in a charge state; and adjusting the buck-boost circuit to be a boost operation mode in the case where the energy storage system works in a discharge state.

In some embodiments of the present disclosure, the voltage measurement and the current measurement of the universal interface are a voltage measurement and a current measurement of a front end of a circuit breaker at the universal interface.

In some embodiments of the present disclosure, the step of obtaining a voltage measurement and a current measurement of the universal interface, to determine whether the apparatus accessed to the universal interface is a photovoltaic system or an energy storage system, comprises: determining whether there is a voltage in the universal interface; and determining that the accessed apparatus is the energy storage system in the case where there is no voltage in the universal interface.

In some embodiments of the present disclosure, the step of obtaining a voltage measurement and a current measurement of the universal interface, to determine whether the apparatus accessed to the universal interface is a photovoltaic system or an energy storage system, further comprises: adjusting the DC to DC converter circuit inside the optical storage converter to operate as a boost circuit in the case where there is a voltage in the universal interface; adjusting a voltage input from the universal interface, and determining whether an output power of the DC to DC converter circuit changes corresponding to the adjusted voltage; determining that the accessed apparatus is the photovoltaic system in the case where the output power of the DC to DC converter circuit changes corresponding to the adjusted voltage; and determining that the accessed apparatus is the energy storage system in the case where the output power of the DC to DC converter circuit does not change corresponding to the adjusted voltage.

In some embodiments of the present disclosure, one universal interface corresponds to one DC to DC converter circuit, the DC to DC converter circuit comprises a first switch tube module and a second switch tube module connected in series, wherein, the first switch tube module comprises a first switch tube and a first freewheeling diode, the second switch tube module comprises a second switch tube and a second freewheeling diode, a first port of the first switch tube module is connected to a first port of a capacitor, a second port of the first switch tube module is connected to a first port of the second switch tube module, a second port of the second switch tube module is connected to a second port of the capacitor, the second port of the first switch tube module is connected to a first port of the universal interface through an inductor, and the second port of the second switch tube module is connected to a second port of the universal interface.

In some embodiments of the present disclosure, the step of adjusting an internal circuit of the optical storage converter correspondingly in the case where the accessed apparatus is the photovoltaic system or the energy storage system comprises: controlling the first switch tube to turn off and controlling the second switch tube to turn on in the case where the accessed apparatus is the photovoltaic system; controlling the first switch tube to turn off and control the second switch tube to turn on in the case where the accessed apparatus is the energy storage system which works in a discharge state; and controlling the first switch tube to turn on, and controlling the second switch tube to turn off in the case where the accessed apparatus is the energy storage system which works in a charge state.

In another aspect of the present disclosure, a control device of an optical storage converter is provided. The device comprises: an accessed apparatus determining module configured to obtain a voltage measurement and a current measurement of a universal interface of the optical storage converter in the case where an apparatus is accessed to the universal interface, to determine whether the apparatus accessed to the universal interface is a photovoltaic system or an energy storage system; and a circuit adjusting module configured to adjust an internal circuit of the optical storage converter correspondingly in the case where the accessed apparatus is the photovoltaic system or the energy storage system.

In some embodiments of the present disclosure, the control device of an optical storage converter is configured to perform operations of implementing the control method of an optical storage converter according to any one of the above-described embodiments.

In another aspect of the present disclosure, a control device of an optical storage converter is provided. The device comprises: a memory for storing instructions; and a processor configured to execute instructions, so that the device performs operations of implementing the control method of an optical storage converter according to any one of the above-described embodiments.

In another aspect of the present disclosure, an optical storage converter, comprising a control device of the optical storage converter according to any one of the above-described embodiments; a universal interface; and a voltage and current collection device, configured to collect a voltage measurement and a current measurement of the universal interface in the case where an apparatus is accessed to the universal interface of the photovoltaic converter, and send the voltage measurement and the current measurement of the universal interface to the control device of the optical storage converter.

In some embodiments of the present disclosure, the optical storage converter further comprises a DC to DC converter circuit, wherein, one universal interface corresponds to one DC to DC converter circuit, and one universal interface corresponds to one voltage and current collection device; the control device of an optical storage converter is connected to the DC to DC converter circuit; the control device of the optical storage converter is configured to determine whether the accessed apparatus is the photovoltaic system or the energy storage system according to the voltage measurement and the current measurement of the universal interface; the DC to DC converter circuit is adjusted to operate as a boost circuit in the case where the accessed apparatus is the photovoltaic system; and the DC to DC converter circuit inside the optical storage converter is adjusted to operate as a buck-boost circuit in the case where the accessed apparatus is the energy storage system.

In some embodiments of the present disclosure, the DC to DC converter circuit comprises a first switch tube module, comprising a first switch tube and a first freewheeling diode; and a second switch tube module, comprising a second switch tube and a second freewheeling diode, wherein, the first switch tube module and the second switch tube module are connected in series; a first port of the first switch tube module is connected to a first port of a capacitor, a second port of the first switch tube module is connected to a first port of the second switch tube module, a second port of the second switch tube module is connected to a second port of the capacitor, the second port of the first switch tube module is connected to a first port of the universal interface through an inductor, and the second port of the second switch tube module is connected to a second port of the universal interface; and the control device of the optical storage converter is connected to control terminals of the first switch tube and the second switch tube respectively, and is configured to control on-off of the first switch tube and the second switch tube.

According to another aspect of the present disclosure, a computer readable storage medium is provided, wherein the computer readable storage medium has computer instructions stored therein which, when executed by a processor, implement the control method of an optical storage converter according to any one of the above-described embodiments.

BRIEF DESCRIPTION OF THE DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DESCRIPTION OF THE INVENTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present disclosure.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

Figure 1:
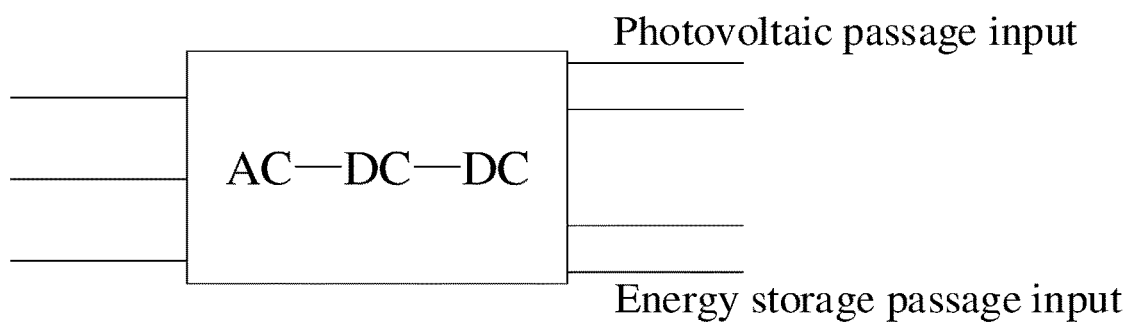
FIG. 1 is a schematic view of some embodiments of an optical storage converter in the related art of the present disclosure.

FIG. 1 is a schematic view of some embodiments of an optical storage converter in the related art of the present disclosure. The inventors have found through studies that: due to the design of an air-cooling solution for a high power system in the related art, the AC to DC, the photovoltaic DC and the energy storage DC are not combined together, so that it is difficult to integrate the air-cooling solution for a high power system. In the related art, the photovoltaic interfaces and the energy storage interfaces of the optical storage converter are fixed passages at fixed positions.

In view of at least one of the above technical problems, the present disclosure provides an optical storage-converter, a control method and device thereof and a computer-readable storage medium, which may design the photovoltaic interface and the energy storage interface as universal interfaces which may be accessed to the photovoltaic system or accessed to the energy storage system.

In view of at least one of the above technical problems, the present disclosure provides an optical storage-converter, a control method and device thereof and a computer-readable storage medium. The present disclosure will be described below through specific embodiments.

Figure 2:
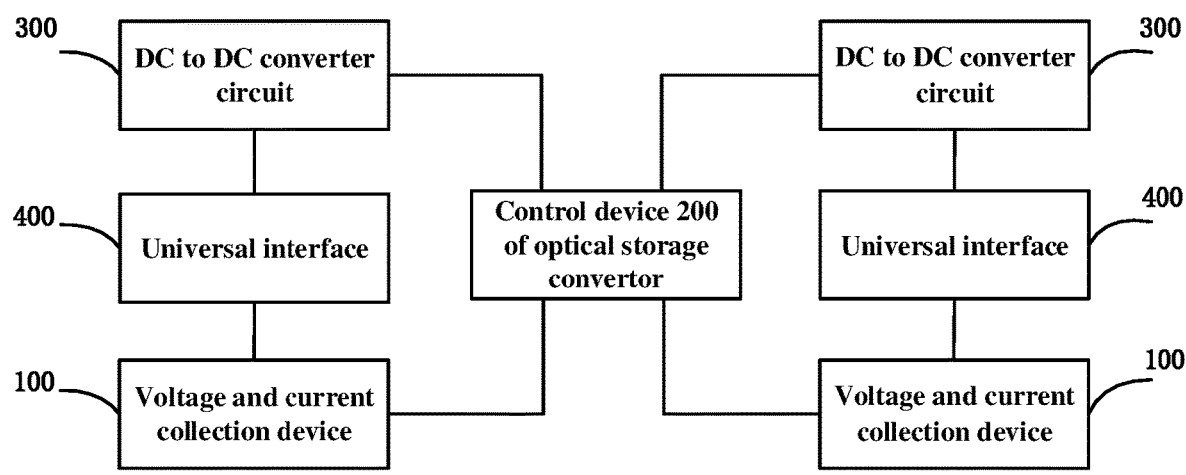
FIG. 2 is a schematic view of some embodiments of an optical storage converter of the present disclosure.

FIG. 2 is a schematic view of some embodiments of an optical storage converter of the present disclosure. As shown in FIG. 2, the optical storage converter of the present disclosure may comprise a control device 200 of an optical storage converter, a voltage and current collection device 100, a direct current to direct current (DC to DC) converter circuit 300 and a universal interface 400.

In some embodiments of the present disclosure, the optical storage converter of the present disclosure may comprise at least one voltage and current collection device 100, at least one direct current-direct current (DC to DC) converter circuit 300 and at least one universal interface 400.

One universal interface 400 corresponds to one DC to DC converter circuit 300, and one universal interface 400 corresponds to one voltage and current collection device 100.

Each universal interface 400 is connected to a corresponding DC to DC converter circuit 300. Each voltage and current collection device 100 is connected to a corresponding universal interface 400.

For example, in the embodiment of FIG. 2, the optical storage converter comprises two universal interfaces 400, which correspond to two DC to DC converter circuits 300 and two voltage and current collection devices 100 respectively.

The voltage and current collection device 100 is connected to the photoelectric storage converter control device 200.

The voltage and current collection device 100 is configured to collect a voltage measurement and a current measurement of the universal interface 400 in the case where an apparatus is accessed to the universal interface 400 of the optical storage converter, and send the voltage measurement and the current measurement of the universal interface 400 to the control device 200 of the optical storage converter.

The control device 200 of an optical storage converter is connected to the DC to DC converter circuit 300.

The control device 200 of an optical storage converter is configured to determine that the accessed apparatus is the photovoltaic system or the energy storage system according to the voltage measurement and the current measurement of the universal interface 400; and control the DC to DC converter circuit 300 to make corresponding adjustments in the case where the accessed apparatus is the photovoltaic system or the energy storage system.

In some embodiments of the present disclosure, the control device 200 of an optical storage converter may be configured to adjust the DC to DC converter circuit 300 inside the optical storage converter to operate as a boost circuit in the case where the accessed apparatus is the photovoltaic system; and adjust the DC to DC converter circuit 300 inside the optical storage converter to operate as a buck-boost circuit in the case where the accessed apparatus is the energy storage system.

The present disclosure can universalize the photovoltaic interface and the energy storage interface, the universal interface of the present disclosure may be accessed to the photovoltaic system or the energy storage system, and the present disclosure may realize internal self-identification and self-adaptation.

Figure 3:
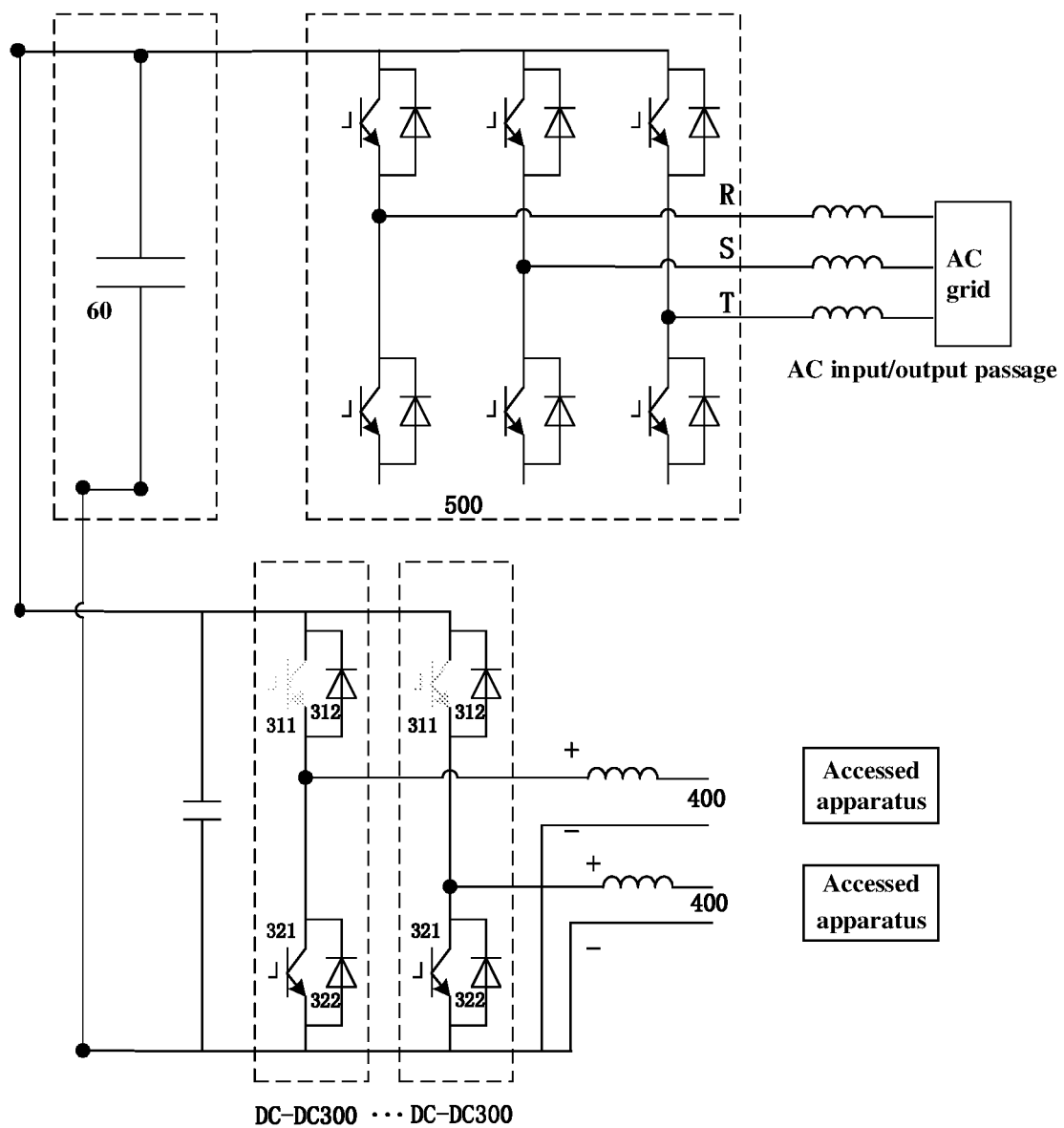
FIG. 3 is a schematic view of other embodiments of an optical storage converter of the present disclosure.

FIG. 3 is a schematic view of other embodiments of an optical storage converter of the present disclosure. As shown in FIG. 3, the optical storage converter of the present disclosure further comprises a direct current to alternating current (DC to AC) converter circuit 500 and a capacitor 600.

The control device 200 of an optical storage converter is configured to determine whether the photovoltaic system or the energy storage system is actually accessed externally by algorithm after the accessed apparatus is actually connected, and implement software function control according to a corresponding interface after completed determining.

In some embodiments of the present disclosure, a refrigerant is directly used for heat radiation.

In some embodiments of the present disclosure, a DC-AC unit, a photovoltaic DC unit, and an energy storage DC unit are integrated in the structure of the optical storage converter, such that the design of a shared material is used to form a modular unit.

The optical storage converter provided on the basis of the above-described embodiments of the present disclosure is a high-power optical storage converter with photovoltaic interface and energy storage interface identification functions. The optical storage converter of the present disclosure structurally integrates a DC-AC unit, a photovoltaic DC unit and an energy storage DC unit, such that the design of a shared material is used to form a modular unit, thereby reducing the cost of other materials added by individual designs. At the same time, in the above-described embodiments of the present disclosure, photovoltaic and energy storage interfaces are designed to realize a high-power optical storage converter with a universal structure and function, without distinguishing whether the universal interface is a photovoltaic interface or an energy storage interface, and may realize the self-adaptation of photovoltaic and energy storage interfaces.

Figure 4:
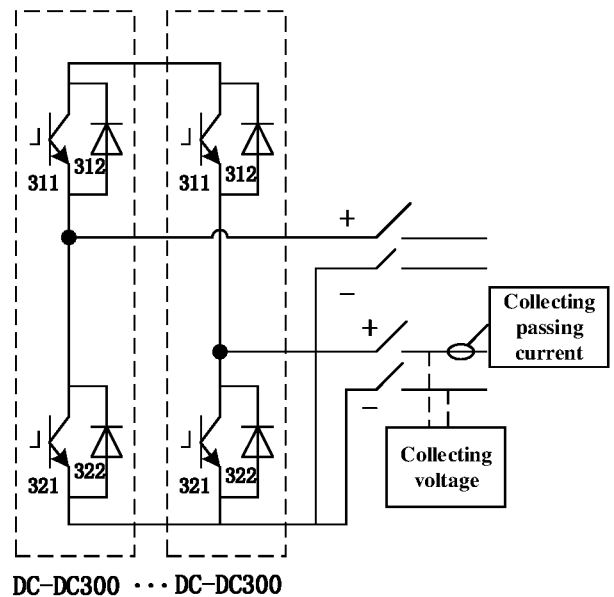
FIG. 4 is a schematic view of collection ports in some embodiments of the present disclosure.

FIG. 4 is a schematic view of collection ports in some embodiments of the present disclosure. As shown in FIG. 4, the voltage and current collection device 100 is connected to a front end of a circuit breaker at the universal interface 400.

The voltage and current collection device 100 is configured to collect a voltage measurement and a current measurement of the front end of the circuit breaker at the universal interface 400 as the voltage measurement and the current measurement of the universal interface 400.

In some embodiments of the present disclosure, as shown in FIGS. 3 and 4, each DC to DC converter circuit 300 may comprise a first switch tube module 310 and a second switch tube module 320 connected in series.

The first switch tube module 310 comprises a first switch tube 311 and a first freewheeling diode 312, and the second switch tube module 320 comprises a second switch tube 321 and a second freewheeling diode 322.

The first port of the first switch tube module 310 is connected to the first port of the capacitor, the second port of the first switch tube module 310 is connected to the first port of the second switch tube module 320, the second port of the second switch tube module 320 is connected to the second port of the capacitor, the second port of the first switch module 310 is connected to the first port of the universal interface 400 through an inductor, and the second port of the second switch module 320 is connected to the second port of the universal interface 400.

In some embodiments of the present disclosure, the first switch tube 311 and the second switch tube 321 may be IGBT switch tubes.

In some embodiments of the present disclosure, the control device 200 of the optical storage converter is connected to the control terminals of the first switch tube 311 and the second switch tube 321 respectively.

The control device 200 of an optical storage converter is configured to control on-off of the first switch tube 311 and the second switch tube 321.

Figure 5:
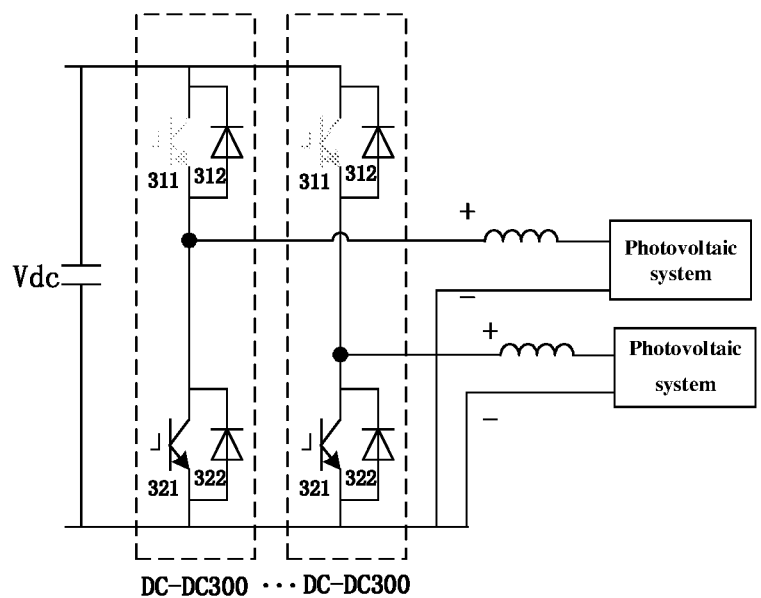
FIG. 5 is a schematic view of a DC to DC converter circuit when the accessed apparatus is a photovoltaic system in some embodiments of the present disclosure.

FIG. 5 is a schematic view of a DC to DC converter circuit when the accessed apparatus is a photovoltaic system in some embodiments of the present disclosure. As shown in FIG. 5, in the case where the accessed apparatus is a photovoltaic system, the control solution is to control an input voltage and find a maximum power output. The control device 200 of the optical storage converter may be configured to control the first switch tube 311 to turn off all the time, use the first switch tube module as a diode, control the second switch tube to turn on, and adjust the DC to DC converter circuit 300 to be a boost circuit, in the case where the accessed apparatus is the photovoltaic system.

Figure 6:
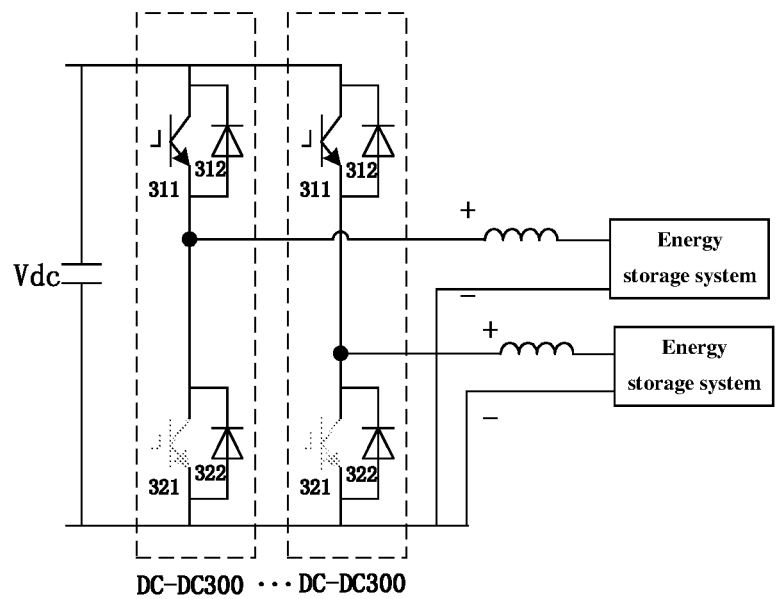
FIG. 6 is a schematic view of a DC to DC converter circuit when the accessed apparatus is an energy storage system and in a discharge state in some embodiments of the present disclosure.

FIG. 6 is a schematic view of a DC to DC converter circuit when the accessed apparatus is an energy storage system and in a discharge state in some embodiments of the present disclosure. As shown in FIG. 6, the control device 200 of an optical storage converter may be configured to control the first switch tube 311 to turn off, control the second switch tube 321 to turn on and adjust the DC to DC converter circuit 300 is adjusted to be a buck operation mode of the buck-boost circuit in the case where the accessed apparatus is the energy storage system working in a discharge state.

Figure 7:
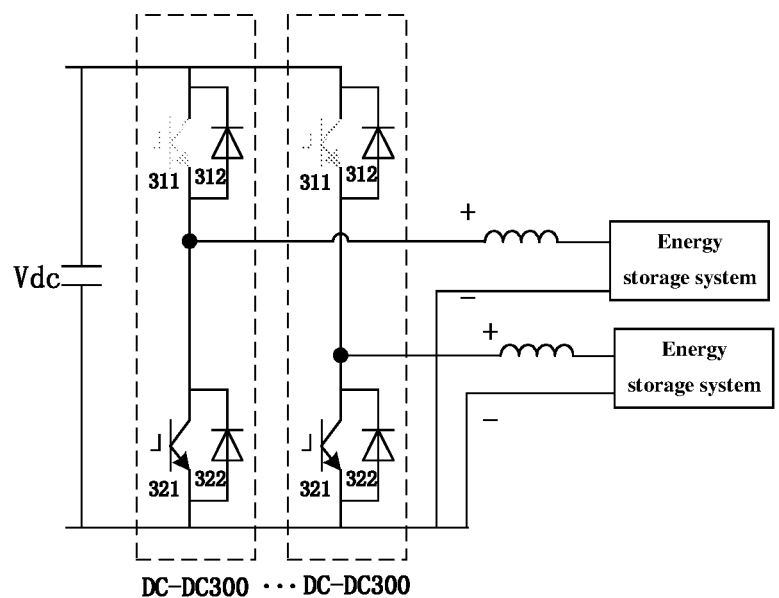
FIG. 7 is a schematic view of a DC to DC converter circuit when the accessed apparatus is an energy storage system and in a charge state according to some embodiments of the present disclosure.

FIG. 7 is a schematic view of a DC to DC converter circuit when the accessed apparatus is an energy storage system and in a charge state according to some embodiments of the present disclosure. As shown in FIG. 7, in the case where the accessed apparatus is the energy storage system and in a charge state, the control solution is to control an output voltage, and debug the controlled input voltage without producing the effect of accessing the photovoltaic system. The control device 200 of an optical storage converter may be configured to control the first switch tube 311 to turn on, control the second switch tube 321 to turn off, and adjust the DC to DC converter circuit 300 to be a boost operation mode of the buck-boost circuit, in the case where the accessed apparatus is the energy storage system working in a charge state.

In some embodiments of the present disclosure, the control device 200 of an optical storage converter may be configured to determine charge and discharge states of the energy storage system according to a received control instruction or according to a current direction of the universal interface 400.

In the embodiments of FIGS. 3 to 7, the optical storage converter comprises two universal interfaces 400, which correspond to two DC to DC converter circuits 300 and two voltage and current collection devices 100 respectively.

In the above-described embodiments of the present disclosure, after a mode is determined, each high-power photovoltaic converter may develop a plurality of interfaces to realize a flexible allocation of interfaces; after an interface state is determined, when the photovoltaic system and the energy storage system are accessed in a mixed manner, the photovoltaic system works in a boost mode, and the energy storage system works in boost and buck modes according to the charge and discharge states. The circuit program in the above-described embodiment of the present disclosure operates according to the determined structure, which may realize the universal interfaces.

In the above-described embodiments of the present disclosure, the AC to DC, photovoltaic DC, and energy storage DC may be combined together in a high-power optical storage converter to provide a new solution. In the solutions of the above-described embodiments of the present disclosure, the photovoltaic interface and the energy storage interface are designed as a universal interface, which may be accessed to a photovoltaic input or an energy storage interface. In the above-described embodiments of the present disclosure, after actual access, it is determined whether the photovoltaic system or the energy storage system is actually accessed externally by algorithm, and after completed determining, software function control is implemented according to the corresponding interface. In the above-described embodiments of the present disclosure, a refrigerant is directly used for heat radiation, and an AC to DC unit, a photovoltaic DC unit and an energy storage DC unit are structurally integrated, and the design of a shared material is used to make a modular unit, thereby reducing the cost of other materials added by individual designs. At the same time, in the above-described embodiments of the present disclosure, photovoltaic and energy storage interfaces may be opened to realize a high-power optical storage converter with a universal structure and function, without distinguishing whether the interface is a photovoltaic interface or an energy storage interface. At the same time, the above-described embodiments of the present disclosure may realize flexible expansion of project accesses.

Figure 8:
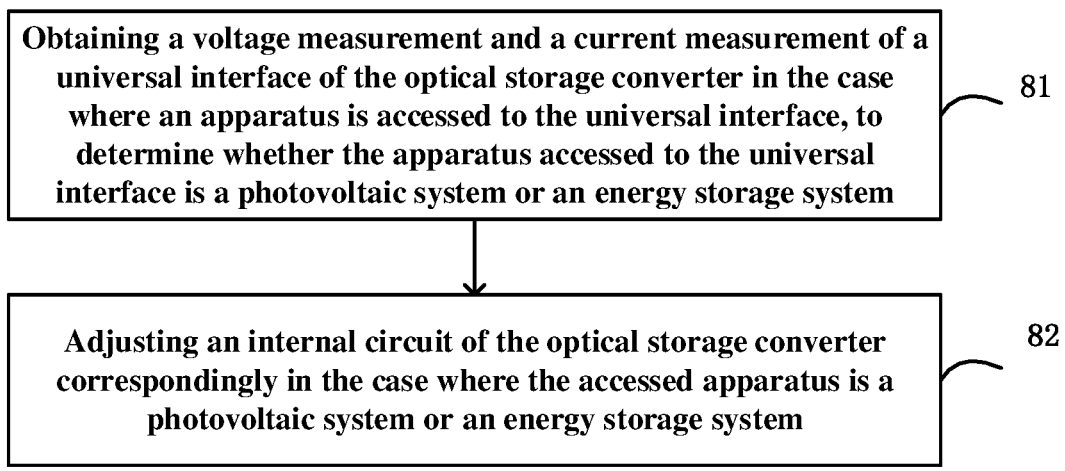
FIG. 8 is a schematic view of some embodiments of a control method of an optical storage converter of the present disclosure.

FIG. 8 is a schematic view of some embodiments of a control method of an optical storage converter of the present disclosure. Preferably, the present embodiment may be implemented by the control device of an optical storage converter according to the present disclosure (for example, the control device 200 of an optical storage converter in the embodiment of FIG. 2). The method in the embodiment of FIG. 8 may comprise step 81 and step 82.

In step 81, in the case where an apparatus is accessed to the universal interface 400 of the optical storage converter, a voltage measurement and a current measurement of the universal interface 400 is obtained, to determine whether the accessed apparatus is the photovoltaic system or the energy storage system.

In step 82, in the case where the accessed apparatus is the photovoltaic system or the energy storage system, an internal circuit of the optical storage converter is correspondingly adjusted.

In some embodiments of the present disclosure, step 82 may comprise step 821 and step 822.

In step 821, in the case where the accessed apparatus is the photovoltaic system, the DC to DC converter circuit 300 inside the optical storage converter is adjusted to operate as a boost circuit, wherein the boost circuit is a unidirectional boost circuit.

In step 822, in the case where the accessed apparatus is the energy storage system, the DC to DC converter circuit 300 inside the optical storage converter is adjusted to operate as a buck-boost circuit, wherein the buck-boost circuit is a buck-boost circuit which can be boosted or bucked bidirectionally.

In some embodiments of the present disclosure, step 822 may comprise: in the case where the energy storage system works in a charge state, the buck-boost circuit is adjusted to be a buck operation mode; and in the case where the energy storage system works in a discharge state, the buck-boost circuit is adjusted to be a boost operation mode.

In some embodiments of the present disclosure, step 82 may comprise steps 82a-82c.

In step 82a, as shown in FIG. 5, in the case where the accessed apparatus is the photovoltaic system, the first switch tube 311 is controlled to turn off, the second switch tube 321 is controlled to turn on, and the DC to DC converter circuit 300 is adjusted to be a boost circuit.

In step 82b, as shown in FIG. 6, in the case where the accessed apparatus is the energy storage system which works in a discharge state, the first switch tube 311 is controlled to turn off, the second switch tube 321 is controlled to turn on, and the DC to DC converter circuit 300 is adjusted to be a buck operation mode of the buck-boost circuit.

In step 82c, as shown in FIG. 7, in the case where the accessed apparatus is the energy storage system which works in a charge state, the first switch tube 311 is controlled to turn on, and the second switch tube 321 is controlled to turn off, and the DC to DC converter circuit 300 is adjusted to be a boost operation mode of the buck-boost circuit.

The control method of an optical storage converter provided on the basis of the above-described embodiments of the present disclosure is a control method of a high-power optical storage converter with photovoltaic and energy storage interface identification functions. The optical storage converter of the present disclosure structurally integrates a DC-AC unit, a photovoltaic DC unit and an energy storage DC unit, such that the design of a shared material is used to form a modular unit, thereby reducing the cost of other materials added by individual designs. At the same time, in the above-described embodiments of the present disclosure, photovoltaic and energy storage interfaces are opened to realize a high-power optical storage converter with a universal structure and function, without distinguishing whether it is a photovoltaic interface or an energy storage interface, and may realize the self-adaptation of photovoltaic and energy storage interfaces.

In the above-described embodiments of the present disclosure, the photovoltaic interface and the energy storage interface may be universalized, and the universal interface may be accessed to the photovoltaic system or the energy storage system, thereby realizing internal self-identification and self-adaptation.

Figure 9:
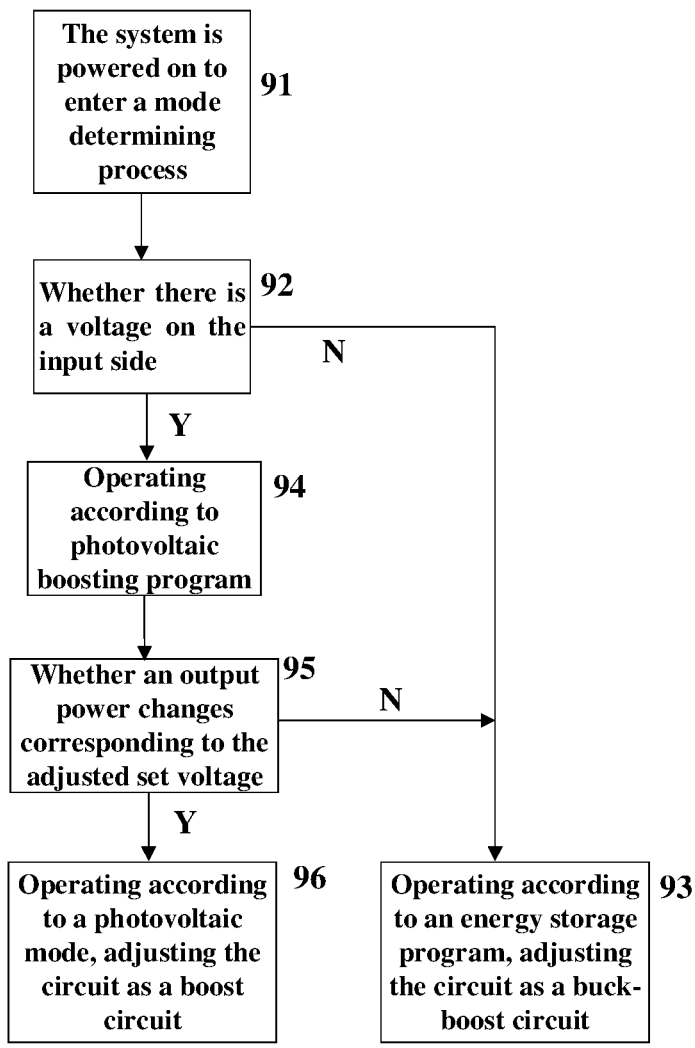
FIG. 9 is a schematic view of other embodiments of a control method of an optical storage converter of the present disclosure.

FIG. 9 is a schematic view of other embodiments of a control method of an optical storage converter of the present disclosure. Preferably, the present embodiment may be implemented by the control device of an optical storage converter according to the present disclosure (for example, the control device 200 of an optical storage converter in the embodiment of FIG. 2). The method in the embodiment of FIG. 9 may comprise steps 91-96.

In step 91, the system is powered on to enter a mode determining process; a voltage measurement and a current measurement of the universal interface 400 is obtained, wherein the voltage measurement and the current measurement of the universal interface 400 is a voltage measurement and a current measurement of a front end of the circuit breaker at the universal interface 400.

In step 92, it is determined whether there is voltage on an input side of the universal interface 400. In the case where there is no voltage in the universal interface 400, step 93 is performed; otherwise, in the case where there is a voltage in the universal interface 400, step 94 is performed.

In step 93, it is determined that the accessed apparatus is the energy storage system, the optical storage converter operates according to an energy storage program, and the DC to DC converter circuit 300 inside the optical storage converter is adjusted to operate as a buck-boost circuit; afterwards, other steps in the present embodiment are no longer performed.

In step 94, the DC to DC converter circuit 300 inside the optical storage converter is adjusted to operate as a boost circuit which firstly performs a trial operation according to a photovoltaic boost program.

In step 95: a set voltage input from the universal interface 400 is adjusted, and it is determined whether an output power of the DC to DC converter circuit 300 changes corresponding to the adjusted set voltage. In the case where the output power of the DC to DC converter circuit 300 changes corresponding to the adjusted set voltage, step 96 is performed; otherwise, in the case where the output power of the DC to DC converter circuit 300 does not change corresponding to the adjusted set voltage, step 93 is performed.

In some embodiments of the present disclosure, since operation is first performed according to a photovoltaic boost program, the photovoltaic may adjust an output current of the photovoltaic system may be adjusted by adjusting the input given voltage, thereby generating a change in power.

In some embodiments of the present disclosure, the set voltage is a given voltage optimized by photovoltaic MPPT (Maximum Power Point Tracking). If it is detected that there is a change in power on an output side of a DC to DC circuit in boost mode after the given voltage is adjusted to operate, it means that the photovoltaic panel (photovoltaic system) is accessed. The change in power on the output side can satisfy a volt-ampere characteristic curve of the photovoltaic system.

In step 96, it is determined that the accessed apparatus is the photovoltaic system, and the DC to DC converter circuit 300 inside the optical storage converter is adjusted to operate as a boost circuit.

In the above-described embodiments of the present disclosure, after a mode is determined, each high-power photovoltaic converter may develop a plurality of interfaces to realize a flexible allocation of interfaces; after an interface state is determined, when the photovoltaic system and the energy storage system are accessed in a mixed manner, the photovoltaic system works in a boost mode, and the energy storage system works in boost and buck modes according to the charge and discharge states.

In the above-described embodiments of the present disclosure, the AC to DC, photovoltaic DC, and energy storage DC may be combined together in a high-power optical storage converter to provide a new solution. In the solutions of the above-described embodiments of the present disclosure, the photovoltaic interface and the energy storage interface are designed as a universal interface, which may be accessed to a photovoltaic input or an energy storage interface. In the above-described embodiments of the present disclosure, after actual access, it is determined whether the photovoltaic system or the energy storage system is actually accessed externally by algorithm, and after completed determining, software function control is implemented according to the corresponding interface. In the above-described embodiments of the present disclosure, a refrigerant is directly used for heat radiation, and an AC to DC unit, a photovoltaic DC unit and an energy storage DC unit are structurally integrated, and the design of a shared material is used to make a modular unit, thereby reducing the cost of other materials added by individual designs. At the same time, in the above-described embodiments of the present disclosure, photovoltaic and energy storage interfaces may be opened to realize a high-power optical storage converter with a universal structure and function, without distinguishing whether the interface is a photovoltaic interface or an energy storage interface. At the same time, the above-described embodiments of the present disclosure may realize flexible expansion of project accesses.

Figure 10:
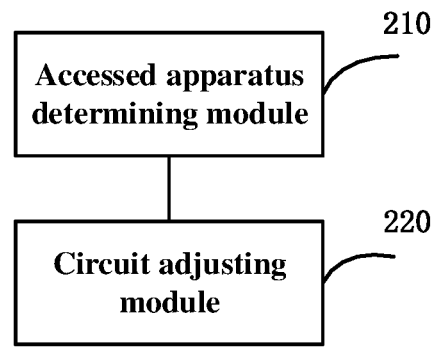
FIG. 10 is a schematic view of some embodiments of a control device of an optical storage converter of the present disclosure.

FIG. 10 is a schematic view of some embodiments of a control device of an optical storage converter of the present disclosure. As shown in FIG. 10, the control device of an optical storage converter of the present disclosure (for example, the control device 200 of an optical storage converter in the embodiment of FIG. 2) may comprise an accessed apparatus determining module 210 and a circuit adjusting module 220.

The accessed apparatus determining module 210 is configured to obtain a voltage measurement and a current measurement of a universal interface of the optical storage converter in the case where an apparatus is accessed to the universal interface, to determine whether the apparatus accessed to the universal interface is a photovoltaic system or an energy storage system.

In some embodiments of the present disclosure, the accessed apparatus determining module 210 may be configured to obtain a voltage measurement and a current measurement of the universal interface 400, wherein the voltage measurement and the current measurement of the universal interface 400 is a voltage measurement and a current measurement of a front end of the circuit breaker at the universal interface 400; it is determined whether there is a voltage in the universal interface 400; in the case where there is no voltage in the universal interface 400, it is determined that the accessed apparatus is the energy storage system.

In some embodiments of the present disclosure, the accessed apparatus determining module 210 may further be configured to adjust the DC to DC converter circuit 300 inside the optical storage converter to operate as a boost circuit in the case where there is a voltage in the universal interface 400; adjust a set voltage input from the universal interface 400, and determine whether an output power of the DC to DC converter circuit 300 changes corresponding to the adjusted set voltage; in the case where the output power of the DC to DC converter circuit 300 changes corresponding to the adjusted set voltage, it is determined that the accessed apparatus is the photovoltaic system; and in the case where the output power of the DC to DC converter circuit 300 does not change corresponding to the adjusted set voltage, it is determined that the accessed apparatus is the energy storage system.

The circuit adjusting module 220 is configured to correspondingly adjust the internal circuit of the optical storage converter in the case where the accessed apparatus is the photovoltaic system or the energy storage system.

In some embodiments of the present disclosure, the circuit adjusting module 220 may be configured to adjust the DC to DC converter circuit 300 inside the optical storage converter to be a boost circuit in the case where the accessed apparatus is the photovoltaic system; and adjust the DC to DC converter circuit 300 inside the optical storage converter to operate as a buck-boost circuit in the case where the input device is the energy storage system.

In some embodiments of the present disclosure, the circuit adjusting module 220 may be configured to adjust the buck-boost circuit to be a buck operation mode in the case where the energy storage system works in a charge state; and adjust the buck-boost circuit to be a boost operation mode in the case where the energy storage system works in a discharge state.

In some embodiments of the present disclosure, the control device 200 of an optical storage converter is configured to implement a control method of an optical storage converter described in any one of the above-described embodiments (for example, the embodiment of FIG. 8 or 9).

Based on the control device of an optical storage converter provided on the basis of the above-described embodiments of the present disclosure, after a mode is determined, each high-power photovoltaic converter may develop a plurality of interfaces to realize a flexible allocation of interfaces; after an interface state is determined, the photovoltaic system and the storage energy system are accessed in a mixed manner, the photovoltaic system works in a boost mode, and the energy storage system works in the boost and buck modes according to the charge and discharge states.

Figure 11:
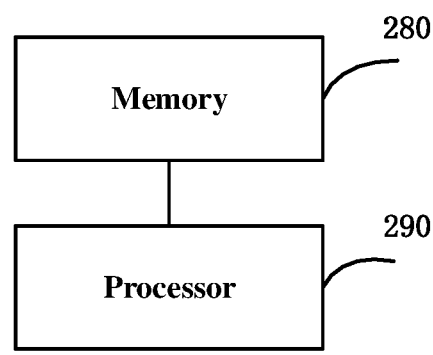
FIG. 11 is a schematic view of other embodiments of the control device of an optical storage converter of the present disclosure.

FIG. 11 is a schematic view of other embodiments of the control device of an optical storage converter of the present disclosure. As shown in FIG. 11, the control device of an optical storage converter according to the present disclosure (for example, the control device 200 of an optical storage converter in the embodiment of FIG. 2) may comprise a memory 280 and a processor 290.

The memory 280 is configured to store instructions.

The processor 290 is configured to execute instructions, so that the device performs operations of implementing the control method of an optical storage converter described in any one of the above-described embodiments (for example, the embodiment of FIG. 8 or 9).

In the above-described embodiments of the present disclosure, the AC to DC, photovoltaic DC, and energy storage DC may be combined together in a high-power optical storage converter. In the solutions of the above-described embodiments of the present disclosure, the photovoltaic interface and the energy storage interface are designed as a universal interface, which may be accessed to a photovoltaic input or an energy storage interface. In the above-described embodiments of the present disclosure, after actual access, it is determined whether the photovoltaic system or the energy storage system is actually accessed externally by algorithm, and after completed determining, software function control is implemented according to the corresponding interface. In the above-described embodiments of the present disclosure, a refrigerant is directly used for heat radiation, and an AC to DC unit, a photovoltaic DC unit and an energy storage DC unit are structurally integrated, and the design of a shared material is used to make a modular unit, thereby reducing the cost of other materials added by individual designs. At the same time, in the above-described embodiments of the present disclosure, photovoltaic and energy storage interfaces may be opened to realize a high-power optical storage converter with a universal structure and function, without distinguishing whether the interface is a photovoltaic interface or an energy storage interface. At the same time, the above-described embodiments of the present disclosure may realize flexible expansion of project accesses.

According to another aspect of the present disclosure, a computer-readable storage medium is provided, wherein the computer-readable storage medium stores computer instructions which, when performed by a processor, implement the control method of an optical storage converter according to any one of the above-described embodiments (for example, the embodiment of FIG. 8 or 9).

Based on the computer-readable storage medium provided by the above-described embodiments of the present disclosure, after a mode is determined, each high-power photovoltaic converter may develop a plurality of interfaces to realize a flexible allocation of interfaces; after an interface state is determined, the photovoltaic system and the storage energy system are accessed in a mixed manner, the photovoltaic system works in a boost mode, and the energy storage system works in the boost and buck modes according to the charge and discharge states.

The control device of an optical storage converter described above may be implemented as a general purpose processor, a programmable logic controller (PLC), a digital signal processor (DSP), an application specific integrated circuit (ASIC)), a field programmable gate array (FPGA) or other programmable logic devices, discrete gate or transistor logic devices, discrete hardware assemblies, or any suitable combination thereof for performing the functions described in the present application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and comprising various modifications.

What is claimed is:

1. A control method of an optical storage converter, comprising:

obtaining a voltage measurement and a current measurement of a universal interface of the optical storage converter in the case where an apparatus is accessed to the universal interface, to determine whether the apparatus accessed to the universal interface is a photovoltaic system or an energy storage system; and adjusting an internal circuit of the optical storage converter correspondingly in the case where the accessed apparatus is the photovoltaic system or the energy storage system, wherein one universal interface corresponds to one DC to DC converter circuit, the DC to DC converter circuit comprises a first module and a second switch tube module connected in series, the first switch tube module comprises a first switch tube and a first freewheeling diode, the second switch tube module comprises a second switch tube and a second freewheeling diode, a first port of the first switch tube module is connected to a first port of a capacitor, a second port of the first switch tube module is connected to a first port of the second switch tube module, a second port of the second switch tube module is connected to a second port of the capacitor, the second port of the first switch tube module is connected to a first port of the universal interface through an inductor, and the second port of the second switch tube module is connected to a second port of the universal interface.

2. The control method of an optical storage converter according to claim 1, wherein the adjusting an internal circuit of the optical storage converter correspondingly in the case where the accessed apparatus is the photovoltaic system or the energy storage system comprises:

adjusting a direct current (DC) to DC converter circuit inside the optical storage converter to operate as a boost circuit in the case where the accessed apparatus is the photovoltaic system; and adjusting the DC to DC converter circuit inside the optical storage converter to operate as a buck-boost circuit in the case where the accessed apparatus is the energy storage system.

3. The control method of an optical storage-converter according to claim 2, wherein the adjusting the DC to DC converter circuit inside the optical storage converter to operate as the buck-boost circuit in the case where the accessed apparatus is the energy storage system comprises:

adjusting the buck-boost circuit to be a buck operation mode in the case where the energy storage system works in a charge state; and adjusting the buck-boost circuit to be a boost operation mode in the case where the energy storage system works in a discharge state.

4. The control method of an optical storage converter according to claim 1, wherein the voltage measurement and the current measurement of the universal interface are a voltage measurement and a current measurement of a front end of a circuit breaker at the universal interface; and the obtaining a voltage measurement and a current measurement of a universal interface of the optical storage converter, to determine whether the apparatus accessed to the universal interface is a photovoltaic system or an energy storage system, comprises:

determining whether there is a voltage in the universal interface; and determining that the accessed apparatus is the energy storage system in the case where there is no voltage in the universal interface.

5. The control method of an optical storage converter according to claim 4, wherein the obtaining a voltage measurement and a current measurement of a universal interface of the optical storage converter, to determine whether the apparatus accessed to the universal interface is a photovoltaic system or an energy storage system, further comprises:

adjusting the DC to DC converter circuit inside the optical storage converter to operate as a boost circuit in the case where there is a voltage in the universal interface;

adjusting a voltage input from the universal interface, and determining whether an output power of the DC-DC conversion circuit changes corresponding to the adjusted voltage;

determining that the accessed apparatus is the photovoltaic system in the case where the output power of the DC-DC conversion circuit changes corresponding to the adjusted voltage; and determining that the accessed apparatus is the energy storage system in the case where the output power of the DC-DC conversion circuit does not changes corresponding to the adjusted voltage.

6. The control method of an optical storage converter according to claim 1, wherein the adjusting an internal circuit of the optical storage converter correspondingly in the case where the accessed apparatus is the photovoltaic system or the energy storage system comprises:

controlling the first switch tube to turn off and controlling the second switch tube to turn on in the case where the accessed apparatus is the photovoltaic system;

controlling the first switch tube to turn off and control the second switch tube to turn on in the case where the accessed apparatus is the energy storage system which works in a discharge state; and controlling the first switch tube to turn on, and controlling the second switch tube to turn off in the case where the accessed apparatus is the energy storage system which works in a charge state.

7. A non-transient computer-readable storage medium, wherein the non-transient computer-readable storage medium has computer instructions stored therein which, when executed by a processor, implement the control method of an optical storage converter according to claim 1.

8. A non-transient computer-readable storage medium, wherein the non-transient computer-readable storage medium has computer instructions stored therein which, when executed by a processor, implement the control method of an optical storage converter according to claim 2.

9. A control device of an optical storage converter, comprising:

an accessed apparatus determining module configured to obtain a voltage measurement and a current measurement of a universal interface of the optical storage converter in the case where an apparatus is accessed to the universal interface, to determine whether the apparatus accessed to the universal interface is a photovoltaic system or an energy storage system; and a circuit adjusting module configured to adjust an internal circuit of the optical storage converter correspondingly in the case where the accessed apparatus is the photovoltaic system or the energy storage system, wherein one universal interface corresponds to one DC to DC converter circuit, the DC to DC converter circuit comprises a first switch tube module and a second switch tube module connected series, the switch tube module comprises a first switch tube and a first freewheeling diode, the second switch tube comprises a second switch tube and a second freewheeling diode, a first port of the first switch tube module is connected to a first port of a capacitor, a second port of the first switch tube module is connected to a first port of the second switch tube module, a second port of the second tube module is connected to a second port of the capacitor, the second port of the first switch tube module is connected to a first port of the universal interface through an inductor, and the second port of the second switch tube module is connected to a second port of the universal interface.

10. An optical storage converter, comprising:

a control device of the optical storage converter according to claim 9;

a universal interface; and a voltage and current collection device, configured to collect a voltage measurement and a current measurement of the universal interface in the case where an apparatus is accessed to the universal interface of the photovoltaic converter, and send the voltage measurement and the current measurement of the universal interface to the control device of the optical storage converter.

11. The optical storage converter according to claim 10, wherein, one universal interface corresponds to one DC to DC converter circuit, and one universal interface corresponds to one voltage and current collection device; the control device of an optical storage converter is connected to the DC to DC converter circuit; the control device of the optical storage converter is configured to determine whether the accessed apparatus is the photovoltaic system or the energy storage system according to the voltage measurement and the current measurement of the universal interface; the DC to DC converter circuit is adjusted to operate as a boost circuit in the case where the accessed apparatus is the photovoltaic system; and the DC to DC converter circuit inside the optical storage converter is adjusted to operate as a buck-boost circuit in the case where the accessed apparatus is the energy storage system.

12. A control device of an optical storage converter, comprising:

a memory for storing instructions; and a processor configured to execute a method for performing the instructions comprising:

obtaining a voltage measurement and a current measurement of a universal interface of the optical storage converter in the case where an apparatus is accessed to the universal interface, to determine whether the apparatus accessed to the universal interface is a photovoltaic system or an energy storage system; and adjusting an internal circuit of the optical storage converter correspondingly in the case where the accessed apparatus is the photovoltaic system or the energy storage system, wherein one universal interface corresponds to one DC to DC converter circuit, the DC to DC converter circuit comprises a first switch module and a second switch tube module connected in series, the first switch tube module comprises a first switch tube and a first freewheeling diode, the second switch tube module comprises a second switch tube and a second freewheeling diode, a first port of the first switch tube module is connected to a first port of capacitor, a second port of the first switch tube module is connected to a first port of the second switch tube module, a second port of the second switch tube module is connected to a second port of the capacitor, the second port of the first switch tube module is connected to a first port of the universal interface through an inductor, and the second port of the second switch tube module is connected to a second port of the universal interface.

13. An optical storage converter, comprising:
a control device of the optical storage converter according to claim 12;
a universal interface; and
a voltage and current collection device, configured to collect a voltage measurement and a current measurement of the universal interface in the case where an apparatus is accessed to the universal interface of the photovoltaic converter, and send the voltage measurement and the current measurement of the universal interface to the control device of the optical storage converter.

14. The control device of an optical storage converter according to claim 12, wherein the adjusting an internal circuit of the optical storage converter correspondingly in the case where the accessed apparatus is the photovoltaic system or the energy storage system comprises:
adjusting a direct current (DC) to DC converter circuit inside the optical storage converter to operate as a boost circuit in the case where the accessed apparatus is the photovoltaic system; and
adjusting the DC to DC converter circuit inside the optical storage converter to operate as a buck-boost circuit in the case where the accessed apparatus is the energy storage system.

15. The control device of an optical storage-converter according to claim 14, wherein the adjusting the DC to DC converter circuit inside the optical storage converter to operate as the buck-boost circuit in the case where the accessed apparatus is the energy storage system comprises:
adjusting the buck-boost circuit to be a buck operation mode in the case where the energy storage system works in a charge state; and
adjusting the buck-boost circuit to be a boost operation mode in the case where the energy storage system works in a discharge state.

16. The control device of an optical storage converter according to claim 12, wherein the voltage measurement and the current measurement of the universal interface are a voltage measurement and a current measurement of a front end of a circuit breaker at the universal interface; and
the obtaining a voltage measurement and a current measurement of a universal interface of the optical storage converter, to determine whether the apparatus accessed to the universal interface is a photovoltaic system or an energy storage system, comprises:
determining whether there is a voltage in the universal interface; and
determining that the accessed apparatus is the energy storage system in the case where there is no voltage in the universal interface.

17. The control device of an optical storage converter according to claim 16, wherein the obtaining a voltage measurement and a current measurement of a universal interface of the optical storage converter, to determine whether the apparatus accessed to the universal interface is a photovoltaic system or an energy storage system, further comprises:
adjusting the DC to DC converter circuit inside the optical storage converter to operate as a boost circuit in the case where there is a voltage in the universal interface;
adjusting a voltage input from the universal interface, and determining whether an output power of the DC-DC conversion circuit changes corresponding to the adjusted voltage;
determining that the accessed apparatus is the photovoltaic system in the case where the output power of the DC-DC conversion circuit changes corresponding to the adjusted voltage; and
determining that the accessed apparatus is the energy storage system in the case where the output power of the DC-DC conversion circuit does not changes corresponding to the adjusted voltage.

18. The control device of an optical storage converter according to claim 12, wherein the adjusting an internal circuit of the optical storage converter correspondingly in the case where the accessed apparatus is the photovoltaic system or the energy storage system comprises:
controlling a first switch tube to turn off and controlling the second switch tube to turn on in the case where the accessed apparatus is the photovoltaic system;
controlling the first switch tube to turn off and control the second switch tube to turn on in the case where the accessed apparatus is the energy storage system which works in a discharge state; and
controlling the first switch tube to turn on, and controlling the second switch tube to turn off in the case where the accessed apparatus is the energy storage system which works in a charge state, wherein the optical storage converter has a DC to DC converter circuit, the DC to DC converter circuit comprises a first switch tube module and a second switch tube module, the first switch tube module comprises a first switch tube, the second switch tube module comprises a second switch tube.

* * * * *

UNITED STATES PATENT AND TRADEMARK OFFICE
CERTIFICATE OF CORRECTION

PATENT NO. : 12,328,073 B2  
APPLICATION NO. : 18/014234  
DATED : June 10, 2025  
INVENTOR(S) : Yingyi Jiang et al.

Page 1 of 1

It is certified that error appears in the above-identified patent and that said Letters Patent is hereby corrected as shown below:

On the Title Page

Column 2, item (57) Abstract, Line 5, delete "of" and insert -- of the --

In the Claims

Column 14, Line 26, Claim 1, delete "first" and insert -- first switch tube --

Column 16, Line 10, Claim 9, delete "connected" and insert -- connected in --

Column 16, Line 10, Claim 9, delete "the" and insert -- the first --

Column 16, Line 12, Claim 9, delete "tube" and insert -- tube module --

Column 16, Line 17, Claim 9, delete "second" and insert -- second switch --

Column 17, Line 2, Claim 12, delete "switch" and insert -- switch tube --

Column 17, Line 8, Claim 12, delete "of" and insert -- of a --

Column 18, Line 40, Claim 18, delete "a first" and insert -- the first --

Signed and Sealed this  
Twenty-ninth Day of July, 2025

Coke Morgan Stewart  
*Acting Director of the United States Patent and Trademark Office*